United States Patent
Gragnic et al.

(10) Patent No.: US 10,115,050 B2
(45) Date of Patent: Oct. 30, 2018

(54) ELECTRONIC DOCUMENT HAVING ANGLED ANTENNA ENDS, ANTENNA HOLDER FOR SUCH AN ELECTRONIC DOCUMENT AND METHOD FOR MANUFACTURING SUCH A DOCUMENT

(71) Applicant: IDEMIA FRANCE, Colombes (FR)

(72) Inventors: Elodie Gragnic, Colombes (FR); Olivier Bosquet, Colombes (FR)

(73) Assignee: IDEMIA FRANCE, Colombes (FR)

( * ) Notice: Subject to any disclaimer, the term of this patent is extended or adjusted under 35 U.S.C. 154(b) by 0 days.

(21) Appl. No.: 15/515,484

(22) PCT Filed: Sep. 29, 2015

(86) PCT No.: PCT/FR2015/052586
§ 371 (c)(1),
(2) Date: Mar. 29, 2017

(87) PCT Pub. No.: WO2016/051065
PCT Pub. Date: Apr. 7, 2016

(65) Prior Publication Data
US 2017/0220919 A1   Aug. 3, 2017

(30) Foreign Application Priority Data

Sep. 30, 2014   (FR) ...................... 14 59311

(51) Int. Cl.
*G06K 19/07* (2006.01)
*G06K 19/077* (2006.01)

(52) U.S. Cl.
CPC . *G06K 19/07754* (2013.01); *G06K 19/07775* (2013.01)

(58) Field of Classification Search
None
See application file for complete search history.

(56) References Cited

U.S. PATENT DOCUMENTS 6,233,818 B1    5/2001  Finn et al.
9,342,779 B2 *  5/2016  Zhang .............. G06K 19/07754
(Continued)

FOREIGN PATENT DOCUMENTS

DE    102012211546 A1   1/2014
EP       0880754 A2    12/1998
(Continued)

OTHER PUBLICATIONS

PCT International Search Report dated Dec. 10, 2015, International Application No. PCT/FR2015/052586, pp. 1-7 (including English Translation).

*Primary Examiner* — Christle I Marshall
(74) *Attorney, Agent, or Firm* — MH2 Technology Law Group, LLP

(57) ABSTRACT

Disclosed is an electronic document, such as an integrated circuit card, that includes a body having a cavity that opens into one of the faces of the body and is defined by walls. The body also includes: an antenna having at least one turn extending between two ends that terminate in a wall of the cavity, a module including a microprocessor and at least two connection terminals dedicated to the antenna and electronically connected by electrical connections firstly to the microprocessor and secondly to the ends of the antenna. The ends of the antenna are arranged in zigzag shapes and each of them is made up of at least two rectilinear portions that are connected together by a bend and in which the rectilinear portion terminating in the cavity is at an angle of inclination relative to the wall at which it terminates.

11 Claims, 2 Drawing Sheets

(56) References Cited

U.S. PATENT DOCUMENTS

2001/0040531 A1* 11/2001 Saito .................... H01Q 1/243
343/895
2007/0271467 A1  11/2007 Ayala et al.

FOREIGN PATENT DOCUMENTS

| EP | 2711873 A1 | 3/2014 |
| EP | 2775426 A1 | 9/2014 |
| FR | 2769390 A1 | 4/1999 |
| WO | 2014/006024 A1 | 1/2014 |

\* cited by examiner

ELECTRONIC DOCUMENT HAVING ANGLED ANTENNA ENDS, ANTENNA HOLDER FOR SUCH AN ELECTRONIC DOCUMENT AND METHOD FOR MANUFACTURING SUCH A DOCUMENT

CROSS-REFERENCE TO RELATED APPLICATIONS

This application is a U.S. National Stage application of International Application No. PCT/FR2015/052586 filed 29 Sep. 2015, which claims priority to French Application No. 1459311 filed 30 Sep. 2014, the entire disclosures of which are hereby incorporated by reference in their entireties.

The invention relates to electronic documents such as integrated circuit (IC) cards, or identity documents.

More particularly, the invention relates to an electronic document comprising a body having a cavity open into one of the faces of the body and defined by walls, the body also including an antenna having at least one turn extending between two ends that terminate in the cavity, a module including a microprocessor, and at least two connection terminals dedicated to the antenna and electronically connected by electrical connection means firstly to the microprocessor and secondly to the ends of the antenna.

Electronic documents are known in the prior art, such as a microcircuit card including an antenna for communicating remotely with a terminal. Such electronic documents include antenna supports that are commonly referred to as "inlays" and that are traditionally fabricated using an ultrasound method as described in Documents U.S. Pat. No. 6,233,818 and EP 0 880 754. That method consists in extending a conductive metal wire on a substrate by means of a tool, such as a sonotrode, that is moved over the substrate and that dispenses the wire. The wire is inlaid in the substrate by means of ultrasound vibration transmitted from the tool to the wire. The vibration is transmitted perpendicularly to the substrate in order to inlay the wire in the thickness of the substrate. The wire is preferably surrounded by an insulating sheath that is heated during a time interval that is very short, thereby improving the adhesion between the sheath surrounding the wire and the substrate.

The tool is controlled by control means serving to define the laying path for the wire. It is thus possible to wind the ends of the wire so as to form a plurality of turns and/or so as to lay the wire in a variety of shapes, such as a zigzag shape or a shoelace shape. The terms zigzag or shoelace shape are used to mean a sinuous line presenting curves directed in alternation in opposite directions. More particularly, a zigzag shape comprises alternating rectilinear portions and bends.

These ends are for connecting electrically to a microcircuit mounted in the card to enable the card to operate contactlessly with a remote reader. For this purpose, the inlay is sandwiched between several layers of plastics material and is assembled to those layers by a lamination method. Thereafter, a cavity is machined in order to lay bare the ends of the antenna that are to be electrically connected to the microcircuit.

The cavity is adapted to receive a module carrying the microprocessor containing information about the bearer of the card and possibly capable of processing other information. The cavity has an upper spot face against which the module rests, and a lower spot face for receiving the microcircuit encapsulated in a resin. The ends of the antenna are exposed in the upper spot face. In order to obtain the largest possible connection area, the ends of the antenna are laid on the substrate so that, after machining, each end of the antenna wire extends as far as the top edge of the cavity portion above the lower spot face.

Nevertheless, it has been found that when the position of the wire forming the ends of the antenna coincides with the top edge of the cavity portion above the lower spot face, the wire initially inlaid in the body of the card is no longer held correctly after machining. Specifically, the wire is machined initially in a vertical plane while the cutter is making the cavity portion above the lower spot face and then in a horizontal plane while the cutter is making the upper spot face. After the machining steps, the portion of the wire furthest from the turn of the antenna is then arranged tangentially to the top edge of the lower spot face.

As a result, the portion of the wire that has been machined along two directions presents a significant risk of being separated from the substrate in which it was initially inlaid. When this portion of wire is moved out of place, it takes up a random position in the cavity or indeed in the zone for connecting the module to the antenna. These two situations lead to a risk of the electronic document malfunctioning. Specifically, when the detached portion of wire is situated in the cavity, it can come into contact with conductive portions situated on the inside face of the module, such as current feeds, thereby leading to a non-negligible risk of a short circuit. Likewise, when the dislocated portion of wire is on the contact zone between the ends of the antenna and the connection terminals connected to the microprocessor, this leads to increased thickness and a reduced contact area.

A solution has therefore been sought to avoid the above-mentioned drawbacks. In particular, a solution has been sought for making it possible to guarantee the largest possible connection area between the ends of the antenna and the module, while guaranteeing that all of the rectilinear portions are held properly.

To this end, the invention provides an electronic document of the above-described type, in which the ends of the antenna extend substantially in the plane of the step, and in which the ends of the antenna are arranged in zigzag shapes and in that each of them is made up of at least two rectilinear or straight portions that are connected together by a bend and in which the rectilinear portion terminating at the lower spot face cavity is slanted relative to the top edge of the cavity portion above the lower spot face.

By means of these provisions, the ends of the antenna extend in the upper spot face as far as the edge of the cavity above the lower spot face. The rectilinear portion leading into the cavity is slanted relative to the wall at which it terminates and it is therefore not cut away over its entire length. As a result the wire of the rectilinear portion is at an angle of inclination relative to the cutting plane of the cavity and this makes it possible to ensure that the wire is cut on the bias so as to prevent the wire being cut parallel to its length. The dimensions of the cut section of the wire arranged on the bias are smaller than the dimensions of a cut on a wire laid parallel. These provisions ensure that a major fraction of the rectilinear portion terminating in the cavity remains embedded in the body of the card. As a result the wire of the rectilinear portion leading into the cavity and corresponding to the portion furthest from the antenna turn is held better.

According to other characteristics:
the rectilinear portions of an end are arranged substantially parallel to one another in the same plane that is slanted relative to the wall;
the module includes a printed circuit board that presents an inside face on which the microprocessor is mounted, and an outside face that includes metal-plated contact areas that are electrically connected to the microcircuit and that are for coming into contact with pins of an external reader;

the bends are inlaid more deeply than the rectilinear portions in the thickness of the body;

the ends of the antenna extend over a width that is not less than the width of the upper spot face;

the ends of the antenna are arranged facing each other on opposite sides of the cavity above the lower spot face;

the angle of inclination of said at least one rectilinear portion lies in the range 1° to 10°, and is preferably 6°, relative to the top edge in the plane of the step;

the electrical connection means are formed by a strip of a conductive adhesive deposited at least on each of the ends of the antenna; and the adhesive is a conductive anisotropic adhesive that is deposited on the step bordering the cavity above the lower spot face.

The present invention can be better understood on reading the following description made with reference to the accompanying drawings, in which.

Figure 1:
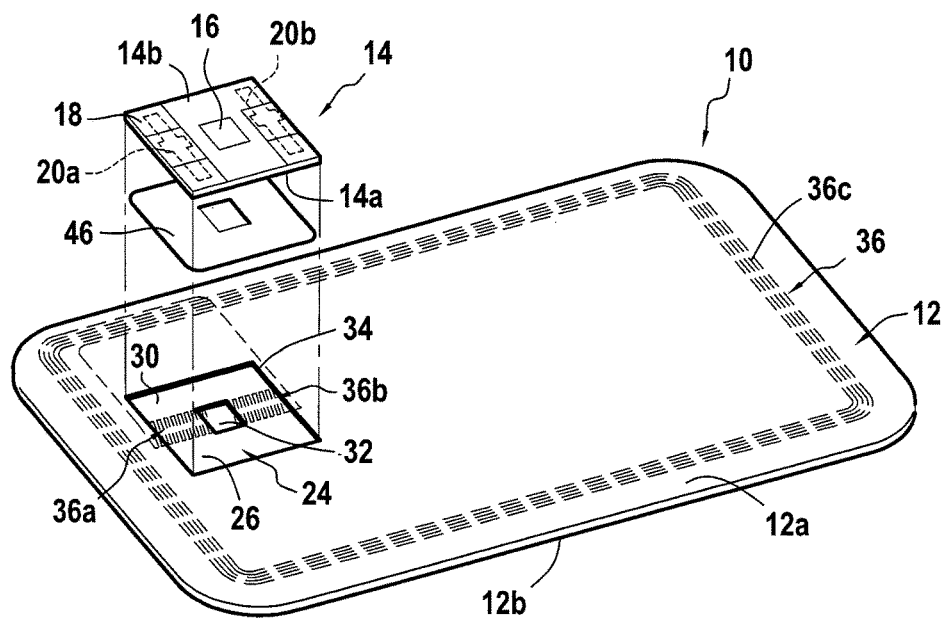
FIG. 1 is an exploded perspective view of a card of the invention.

A microcircuit card 10 shown in FIG. 1 comprises a body 12 of plastics material defined between a front face 12a and a rear face 12b extending substantially in a horizontal plane. The body 12 is a thin sheet of plastics material. The dimensions of the card are specified in the ISO 7810 and ISO 7816 standards and they have the following values: 85 millimeters (mm)×54 mm×0.76 mm. Its thickness, in the vertical direction is negligible compared with its width and length dimensions.

Such a body 12 is made by any method. A conventional method is laminating layers of plastics material by hot rolling. The layers have various functions. Thus, a central inner layer or substrate may be a structural layer giving the body 12 of the card 10 its stiffness or serving as a support for an electronic component. Intermediate layers on either side of the substrate may include inscriptions or decoration having an informative or a decorative function. Outer layers, advantageously transparent layers, typically terminate the stack and provide surface protection for the inner layers.

The card 10 also has a microcircuit module 14, formed by a printed circuit board of small thickness. The printed circuit board presents an inside face 14a on which a chip 16 or microprocessor is mounted. The outside face 14b of the printed circuit board has metal-plated contact areas 18 that are connected firstly to the microcircuit and that are intended secondly for coming into contact with the pins of an external reader. The metal-plated contact areas 18 thus enable the card 10 to communicate with an external terminal by physical contact.

In the body 12 of the card 10 there is provided cavity 24 opening out in the front face 12a of the card 10. The card 10 receives the microcircuit module 14. This cavity is defined by walls extending perpendicularly or slanted relative to the faces 12a and 12b of the card body. In a preferred embodiment shown in the accompanying figures, the cavity 24 includes a lower spot face 26 and an upper spot face 28, to leave room for the microcircuit. The lower spot face 26 is deeper than the upper spot face. The upper spot face forms a step 30 surrounding the portion of the cavity above the lower spot face 26. As shown in FIG. 1, cavity portion above each of the lower spot face 26 and the upper spot face 28 is defined circumferentially by a respective rectangular top edge 32, 34. The top edge 32 of the cavity portion of the lower spot face 26 corresponds to the intersection between the horizontal cutting plane of the upper spot face 28 and the vertical cutting plane of the lower spot face 26.

So-called "dual" cards are also known that are adapted to communicate either with external readers by making physical contact with pins as described above, or else remotely, without making physical contact, by means of an antenna 36. Such cards incorporate the antenna 36 in the body 12. Under such circumstances, the inside face 14a of the module 14 includes connection terminals 20a, 20b that are connected to the microcircuit and that are for being connected electrically with an antenna 36 arranged in the body 12 of the card 10.

Figure 2:
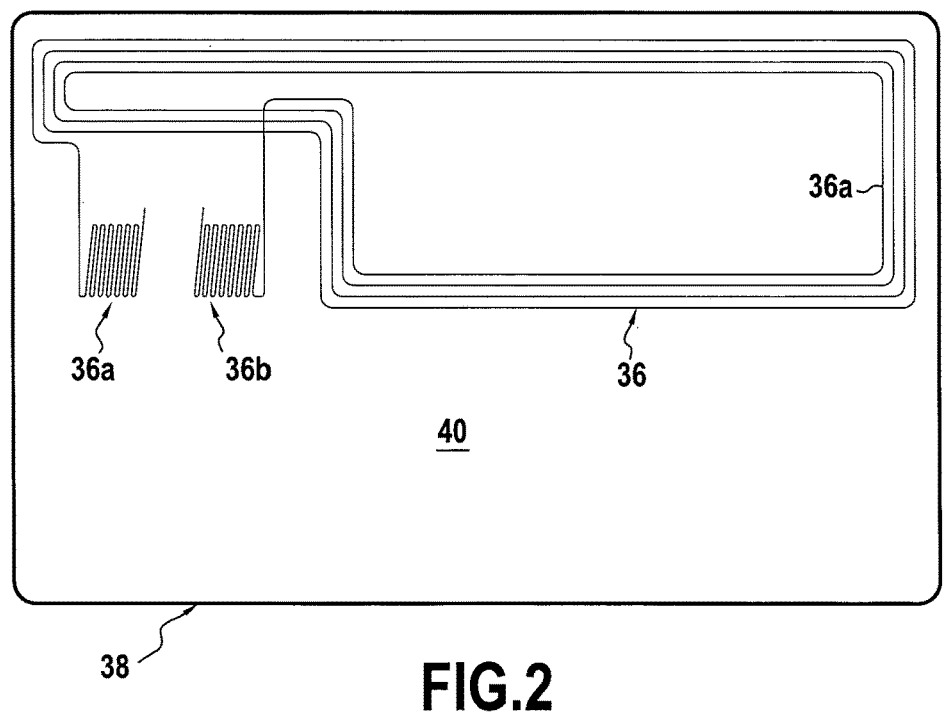
FIG. 2 is a view of a substrate supporting the antenna and for incorporating in an IC card of the invention.

For this purpose, an antenna support 38 shown in FIG. 2 forms an inside layer of the card 10 and is inserted between the other layers prior to the laminating operation. The antenna support 38 is formed on a substrate 40 made of plastics material, such as polyethylene terephthalate (PET), polyvinyl chloride (PVC), or polycarbonate. A wire forming the antenna 36 is unwound and inlaid on the antenna support 38, after which the support is covered by the other layers and then laminated with those layers.

Figure 3:
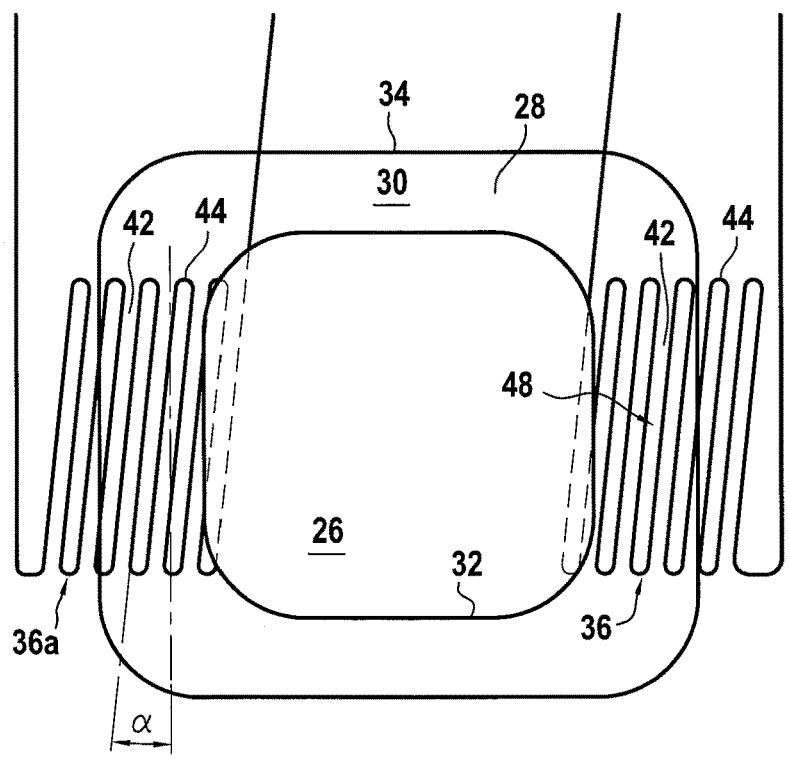
FIG. 3 is a detail view of the cavity into which the ends of the antenna lead.

The antenna 36 consists of a winding. It comprises at least one turn 36c and two ends 36a and 36b between which the turn 36c extends. As can be seen in FIG. 3, each of the ends 36a and 36b of the antenna 36 presents a zigzag shape made up of at least two rectilinear portions 42 and two bends 44 that can be seen in greater detail in FIG. 4. The antenna ends 36a and 36b extend as far as the cavity above the lower spot face 26. The antenna ends 36a and 36b preferably extend over at least the width of the upper spot face 28.

At least the rectilinear portion leading toward the lower spot face, in other words the portion furthest from the turn 36c, is slanted relative to the wall at which it terminates.

The antenna wire 36 is inlaid in the thickness of the first substrate 40 from a first face in such a manner that the rectilinear portion 42 extends substantially in the same plane. The rectilinear portions 42 preferably extended in the plane in which the step 30 is machined. These provisions ensure that the rectilinear portions 42 are positioned at a constant depth so as to guarantee as large a machining window as possible. The depth of the upper spot face forming the step 30 is then selected so that the ends 36a and 36b of the antenna are brushed and machined in a plane substantially parallel to the plane of the first substrate 40 so as to make at least one machined section of the rectilinear portion 42 accessible on the step 30. Advantageously, the machined section is made in a thickness lying in the range 10% to 40% of the diameter of the wire forming the antenna 36.

The ends 36a and 36b of the antenna 36 are thus arranged facing connection terminals 20a and 20b with which they will be in electrical contact. In the variant shown in FIG. 1, the ends 36a and 36b of the antenna 36 are arranged facing each other on either side of the lower spot face 26.

Once they have been machined, the two ends 36a and 36b of the antenna 36 are intended to come into contact with two dedicated connection terminals 20a and 20b via a conductive connection element. The ends 36a and 36b are thus arranged facing the connection terminals 20a and 20b with which they are to come into electrical contact. For this purpose, a conductive film 46 is deposited on the step 30.

This film 46 is preferably an aniostropic adhesive having conductivity properties that can be modified under the action of external pressure. The anisotropic conductive adhesive provides the adhesion between the ends 36a and 36b of the antenna 36 and the connection terminals 20a and 20b, and also generates electrical interconnections that are reliable and stable. The adhesive presents the properties set out above after a short period of bonding by thermocompression.

According to the invention, each of the two ends 36a and 36b of the antenna 36 is arranged as a zigzag or shoelace shape, i.e. as successive alternating rectilinear portions 42 and curved portions forming bends 44. As mentioned above, the ends 36a and 36b of the antenna are embedded in the thickness of the card body 10 to a depth corresponding to the horizontal cutting plane forming the bottom of the upper spot face, i.e. the step 30. Furthermore, the ends 36a and 36b are positioned in the thickness of the card 10 in such a manner that the rectilinear portions 42 are scraped by the machining cutter so that the metal of the wire is laid bare after machining away its insulating sheath, thus providing an electrical contact zone that is intended to come into contact with the terminals on the inside face of the module 14.

Figure 4:
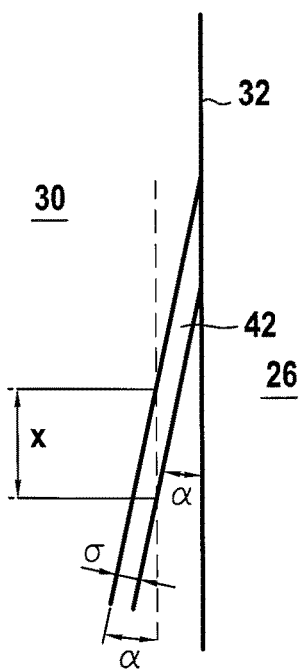
FIG. 4 is a detail view of FIG. 3.

In the invention, for each end of the antenna, at least the rectilinear portion 42 furthest from the turn 36c is arranged to be slanted relative to the top edge 32 of the lower spot face 26 where it terminates. As can be seen in FIG. 4, the angle of inclination of the wire is written α, the diameter of the wire covered in its sheath is written Ø, and the length of the cut section is written x. The length x of the cut section in the plane of the step 30 complies with the following relationship:

$$x = \frac{\emptyset}{\sin\alpha}$$

These provisions thus make it possible to cut the wire over a length that is proportional to the diameter of the initial wire.

Preferably, all of the rectilinear portions 42 of an end are parallel to one another and they are all slanted at an angle α. The rectilinear portions 42 may be slanted at an angle measured clockwise or counterclockwise relative to the top edge 32.

Since the diameter Ø of the wire is constant, it follows that the greater the angle of inclination of the wire relative to the top edge 32, the shorter the length of the cut. These provisions thus limit the risk of the wire being dislodged from the plastics substrate in which it is inlaid. The angle of inclination lies in the range 1° to 10° and is preferably 6°.

It is nevertheless advantageous to limit the angle of inclination to a maximum of 10° so as to avoid cutting the rectilinear portions 42 and/or the bends 44 nearer to the turn 36c of the antenna 36. An increase in the angle of inclination would lead to an increase in the risk of cutting the bends 44 and/or the rectilinear portions 42 that are closest to the turn 36c of the antenna 36, thereby preventing the rectilinear portions 42 following it from being electrically connected. The connection area with the connection terminal of the module 14 would then be considerably reduced.

The rectilinear portions 42 are deposited in the substrate 40 so as to be substantially in parallel alignment with one another and they are spaced apart by some minimum spacing. This spacing is selected depending on the diameter of the wire. Furthermore, the rectilinear portions 42 are inlaid substantially in the same inlay plane, which is itself parallel to the outside face 12a of the substrate 40.

In addition, a minimum angle of slant is calculated as a function of the minimum spacing 48 needed between two rectilinear portions 42, this gap 48 varying with the diameter of the wire. By way of example, a wire having a diameter of 112 micrometers (μm) has a spacing of at least 300 μm between each of the rectilinear portions 42, and a wire having a diameter of 130 μm has a minimum spacing of 400 μm between each of the rectilinear portions 42. For a rectilinear portion 42 having a length equal to ±5 mm, the minimum angle is obtained by performing the following calculation:

ArcTan(spacing/length)

For a diameter of 112 μm, the minimum angle of slant is thus 1.71°, and for a diameter of 130 μm, the minimum angle is 4.57°.

The antenna support 38 is made using a method known in the prior art and described briefly in the introduction of the present description. The method is performed by a tool having means for dispensing the antenna wire 36 and for inlaying it in a substrate 40 forming the antenna support 38. The tool includes dispenser means such as a nozzle adapted to deliver the wire progressively onto the substrate 40. The tool also has control means for steering the nozzle and controlling its speed. The control means may be set so as to control the angle of slant, the laying speed, and the depth to which the wire is pushed in. Finally, the tool may include heater means in order to perform local heating leading to a small amount of melting of the plastics material and/or of the sheath of the wire. The antenna support 38 has a substrate 40 extending in a longitudinal direction and in a transverse direction and including an antenna 36 having at least one turn 36c, the antenna 36 presenting ends 36a and 36b that are arranged as zigzag shapes, each made of at least two rectilinear portions 42 that are connected together by a bend 44 and in which at least the rectilinear portion 42 furthest from the turn 36c is slanted relative to the transverse direction.

The invention also provides a method of fabricating an electronic document, such as a card 10 of bank card format or an identity card having dimensions as specified in the ISO 7816 standard. The fabrication method consists in forming an antenna support 38 with an antenna 36 having ends 36a and 36b that present rectilinear portions 42 that are arranged in a slanted manner relative to the top edge 32. The method includes a step of laying a wire on a first substrate 40 so as to form at least one antenna turn 36c and two ends 36a and 36b arranged in zigzag shapes, each made up of at least two rectilinear portions 42 that are connected together by a bend, at each of the ends 36a and 36b, with at least one rectilinear portion 42 that leads to the lower spot face and that is laid so as to be slanted relative to the top edge 32. Thereafter, the method consists of incorporating the above-described antenna support 38 in a body 12 of a card 10. The method includes an assembly step in which at least a second substrate is assembled with the first substrate 40. For this purpose, the antenna support 38 is assembled with other layers of plastics material, such as layers of PET, or PVC, or of polycarbonate, by laminating with a hot rolling method enabling the various layers to be bonded together. The body 12 of the card 10 that is obtained is then machined so as to form a cavity 24 opening out into the front face 12a of the body 12 of the card 10. The depth of machining is determined depending on the positions of the ends 36a and 36b of the antenna 36 in the thickness of the body 12 of the card 10. More particularly, the depth of the cavity 24 is determined so that the rectilinear portion 42 of the ends 36a and 36b of the antenna are partially machined. A machined section 31 of the rectilinear portion 42 is then accessible and is intended to be connected electrically to the contact terminals of the module 14. Thereafter, the method includes a step of depositing electrical connection means and a step of putting a microcircuit module 14 into place in the cavity 24, and a step of establishing an electrical connection between the module 14 and the ends 36a and 36b of the antenna.

The invention claimed is:

1. An electronic document comprising:
   a body having a cavity open into one of the faces of the body and defined by walls;
   the body including an antenna having at least one turn extending between two ends that terminate in a wall of the cavity;
   a module including a microprocessor and at least two connection terminals dedicated to the antenna and electronically connected by electrical connection means firstly to the microprocessor and secondly to the ends of the antenna; and
   the cavity presenting a lower spot face having a wall with a top edge, and an upper spot face forming a step surrounding the bottom spot face;
   wherein:
   the ends of the antenna extend substantially in the plane of the step; and
   the ends of the antenna are arranged in zigzag shapes such that each of the ends is made up of at least two rectilinear portions that are connected together by a bend and in which a rectilinear portion terminating at the lower spot face is slanted relative to the top edge of the wall of the lower spot face.

2. An electronic document according to claim 1, wherein the at least two rectilinear portions of an end are arranged substantially parallel to one another in an arrangement that is slanted relative to the wall.

3. An electronic document according to claim 1, wherein the module includes a printed circuit board that presents an inside face on which the microprocessor is mounted, and an outside face that includes metal-plated contact areas that are electrically connected to a microcircuit and that are for coming into contact with pins of an external reader.

4. An electronic document according to claim 1, wherein the bends are inlaid more deeply than the rectilinear portions in the thickness of the body.

5. An electronic document according to claim 1, wherein the ends of the antenna extend over a width that is not less than the width of the upper spot face.

6. An electronic document according to claim 5, wherein the ends of the antenna are arranged facing each other on opposite sides of the lower spot face.

7. An electronic document according to claim 1, wherein the angle of slant of said rectilinear portion lies in the range 1° to 10° relative to the top edge in the plane of the step.

8. An electronic document according to claim 1, including a conductive anisotropic adhesive that is deposited on the step surrounding the bottom spot face.

9. A method of fabricating an electronic document according to claim 5, the method comprising:
   a) laying a wire on a first substrate so as to form at least one antenna turn and two ends arranged in zigzag shapes and each made up of at least two rectilinear portions connected together by a bend;
   b) assembling at least a second substrate with the first substrate;
   c) machining a cavity having a lower spot face having a wall with a top edge and an upper spot face forming a step surrounding the bottom spot face;
   d) depositing electrical connection means; and
   e) putting a microcircuit module into place in the cavity and electrically connecting the module with the ends of the at least one antenna turn;
   wherein in step a) for each of the ends, at least one rectilinear portion that terminates at the wall of the lower spot face is laid at an angle of slant relative to the top edge.

10. An antenna support including a substrate extending in a longitudinal direction and in a transverse direction and including an antenna comprising at least one turn, the antenna further comprising ends arranged in zigzag shapes and each end made up of at least two rectilinear portions that are connected together by a bend and in which at least one rectilinear portion furthest from the at least one turn is at an angle of slant relative to the transverse direction.

11. An antenna support according to claim 10, wherein said at least one rectilinear portion that is the furthest from the at least one turn is slanted at an angle lying in the range 1° to 10°.

* * * * *